US006342903B1

(12) United States Patent
Fado et al.

(10) Patent No.: US 6,342,903 B1
(45) Date of Patent: Jan. 29, 2002

(54) USER SELECTABLE INPUT DEVICES FOR SPEECH APPLICATIONS

(75) Inventors: Frank Fado, Highland Beach; Peter Guasti, Coral Springs; Amado Nassiff, Boynton Beach; Ronald Van Buskirk, Indiantown; Harvey Ruback, Loxahatchee, all of FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/257,823

(22) Filed: Feb. 25, 1999

(51) Int. Cl.[7] ................................................ G09G 5/00
(52) U.S. Cl. .................. 345/716; 345/727; 704/270
(58) Field of Search ................................ 345/716, 727, 345/728; 704/270

(56) References Cited

U.S. PATENT DOCUMENTS

| | | | | |
|---|---|---|---|---|
| 5,812,882 A | * | 9/1998 | Raji et al. ..................... 710/72 |
| 5,819,225 A | * | 10/1998 | Eastwood et al. .......... 704/275 |
| 5,850,627 A | * | 12/1998 | Gould et al. ................ 704/231 |
| 5,943,649 A | | 8/1999 | Fado et al. |
| 5,974,382 A | * | 10/1999 | Fado et al. ................. 704/270 |
| 6,009,519 A | * | 12/1999 | Jones et al. ..................... 713/1 |
| 6,192,339 B1 | * | 2/2001 | Cox ............................. 704/270 |

FOREIGN PATENT DOCUMENTS

WO   WO 98/45773   10/1998

\* cited by examiner

*Primary Examiner*—Raymond J. Bayerl
*Assistant Examiner*—Tadesse Hailu
(74) *Attorney, Agent, or Firm*—Akerman Senterfitt

(57) ABSTRACT

A method for enabling user selectable input devices for dictation or transcription in a speech application, comprising the steps of: establishing a registry of dictation and transcription device descriptions, each of the descriptions including a device specific image, a device specific set of device-connecting instructions and a device specific list of audio configuration parameters; building dynamic tables containing information retrieved from the registry; establishing and storing a plurality of enrollments, each of the enrollments representing a speech file of user specific training data corresponding to at least one of a specific audio input device and a specific audio environment; and, generating GUI display screen using the information in at least one of the dynamic tables to enable user selection any input device in the registry for which one of the enrollments is available, for use as a dictation or transcription input to the speech application.

12 Claims, 16 Drawing Sheets

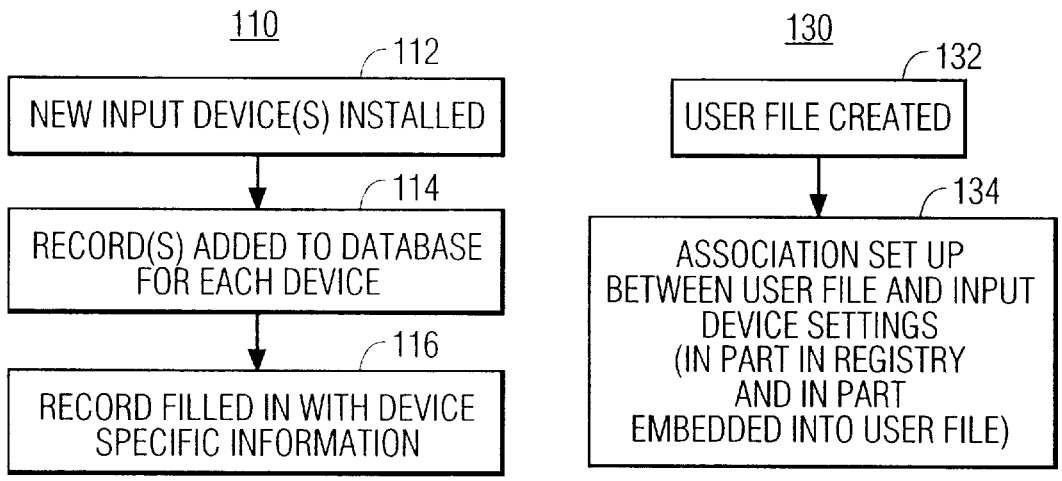
FIG.3
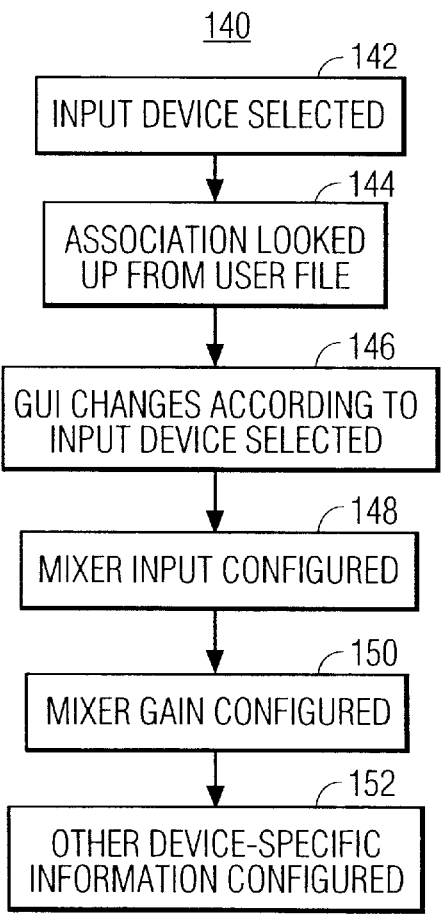
FIG.5
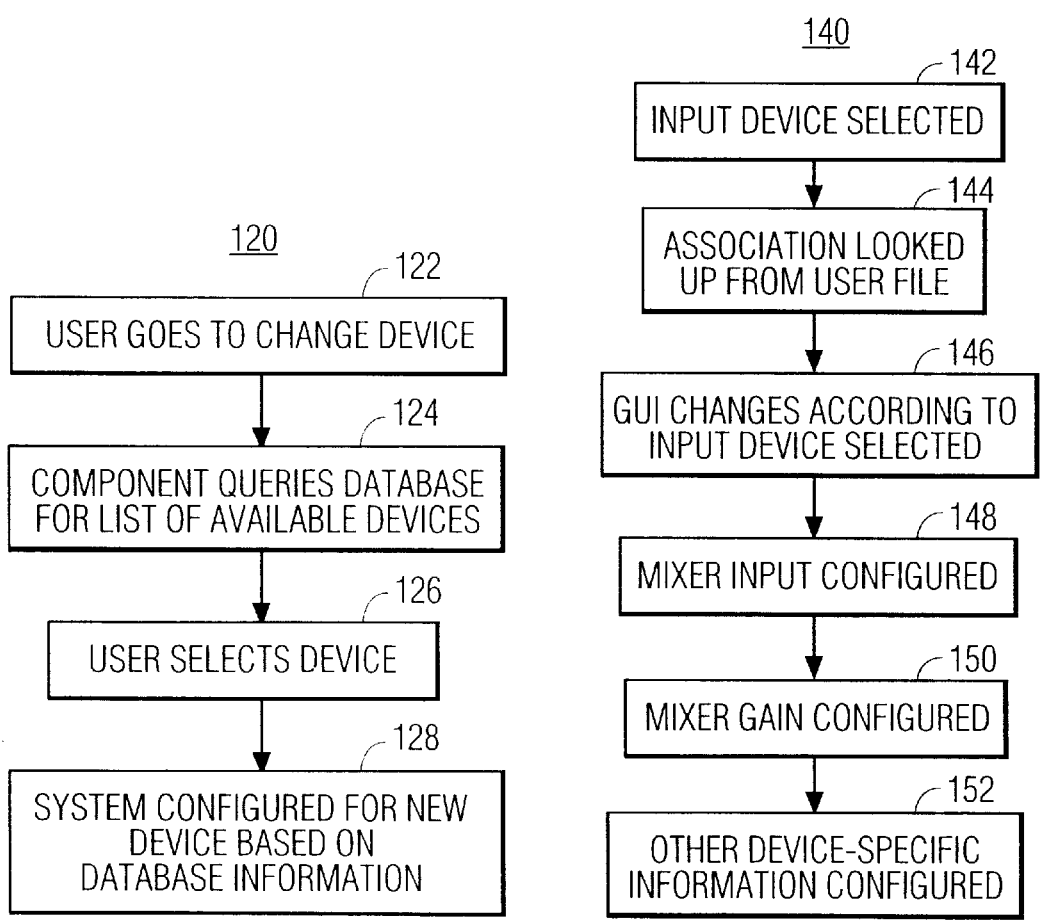
FIG.4
FIG.6

USER SELECTABLE INPUT DEVICES FOR SPEECH APPLICATIONS

BACKGROUND OF THE INVENTION

1. Field of the Invention

This invention relates generally to the field of connecting audio input devices to audio systems in computers, as well as determining the proper audio settings for the audio input devices to achieve optimal results. In particular, this invention relates to selecting, connecting and optimizing all audio input devices, not just microphones.

2. Description of Related Art

Typically, audio input devices for computers have been only microphones. The use of alternative input devices in connection with personal computers has increased in popularity due to the advent of inexpensive multimedia computers. Alternative audio input devices can include, for example, personal transcription devices, that is, hand-held recorders used for dictation. In some cases, these devices are analog and use recording tape. More recent arrivals in the marketplace are digital recorders using flash memory cards. Example of such digital input devices are the Olympus® D1000 or the Sony® ICD-70. Such audio input devices, and others, can be used in addition to microphones to provide audio inputs to speech recognition applications in computers. Inasmuch as microphones are considered the fundamental audio input device, the alternative audio input devices need to be connected to other input plugs and ports. Such plugs and ports are generally designated as line-in or auxiliary plugs and ports. The term input device as used herein is intended to cover all sources of audio input signals, particularly those sources other than microphones, for example, line-in or auxiliary devices.

Audio input devices are generally connected to sound cards installed within a computer, for example a personal computer. The sound card receives and digitizes the analog signals generated by the input device. The digital signals are processed by the processor of the computer for performing functions such as storage of the audio file in memory or other audio related functions. The audio levels, as measured by the amplitude of the audio input waveform, at which the analog audio signals are recorded prior to being digitized are critical to any application that subsequently uses this data. It will be appreciated that each of the alternative audio input devices can have characteristically different output signals, requiring different kinds of jacks or ports and requiring different parameters with respect to setting up the sound card. These differences can be manifested from manufacturer to manufacturer, and from model to model of each manufacturer. Moreover, sound cards from different manufacturers, as well as different sound cards produced by the same manufacturer, will also have different characteristic responses to input signals. Despite the vast potential for variation of alternative input devices and sound cards, each speech application has optimum signal parameter requirements independent of the audio input sources which must be satisfied to maximize the efficiency of the speech recognition engine in the speech application. The audio levels at which the analog audio signals are recorded, prior to being digitized, are critical to any application that uses this data. These settings can adversely affect applications that require audio signals to function properly.

There are many ways in which audio input devices can be improperly connected and audio systems can be misconfigured. These include, for example, selection of the wrong sound card, selection of the wrong audio input device, loose plugs, selection of the wrong jack, improper setting of mute switches, battery problems in microphones and adapters, environments with high background noise, improper adjustment of audio parameters and the presence of disruptive audio feedback.

The present approach to this problem, to the extent there is any approach at all, is the use of a manual procedure. Manual procedures require considerable user intervention, which is by nature problematic at best. Accordingly, a significant need exists for a method and apparatus that facilitates the proper connection of the input device or devices and the configuration of the respective audio settings, no matter the variation of the input devices and sound cards and speech applications. The method and apparatus should be user-friendly, insofar as sophisticated knowledge of computer operation should not be required. The method or apparatus should address all of the problems which can be encountered, and in so doing, should display diagnostic information and clear instructions to the user for correcting problems.

Certain characteristics of the digitized signals can be used to enhance algorithms that process the signals. In other word, a cleaner, less noisy audio input signal enhances the performance of the speech recognition engine. One such class of algorithms that processes digitized signals are those that perform speech recognition. Some speech recognition systems allow the user to train the speech recognition engine with digitized samples of the user's own speech. This training produces a set of training data that is associated with a particular user and/or enrollment. This generally increases the performance and accuracy of the system because the speech application is taking into account specific voice and speaking characteristics of the user gathered during training, the environment and the corresponding audio input device. The system can be trained, for example, for different input devices, such as microphones and line-in devices. The system can also be trained, for example, for a low or high background noise environment. Such training gives the user the flexibility to optimally tailor the system to the user's particular needs. However, performance of the system using the data, for example the accuracy of a speech recognition, can suffer severely if the speech recognition engine is using a particular set of training data that does not correspond correctly to the current digitized signals coming in from the sound card. This can easily occur if the user accidentally mismatches the input device or environment with the selected training data.

Accordingly, a need exists for a method and apparatus that programmatically maintains the correct association between a user's training data and the corresponding audio input device.

Audio feedback is a problem caused by having an open microphone in the acoustic field of the corresponding output speaker. The audio levels in which the analog audio signals are recorded at, prior to being digitized, are critical to any application that uses this data. Before the audio settings can be correctly set for a particular device, that device has to be correctly connected to the computer and correctly set up for use with the computer. However, an incorrectly configured audio mixer has the potential of causing audio feedback that is not only annoying, but in severe cases can cause hearing problems. This problem usually manifests itself as a loud high-pitched sound, often described as a squeal or whistle. The user will generally have no idea of the potential of audio feedback, and if this is the case, the user probably will not recognize the need to correct the problem proactively.

Accordingly, a need exists to identify the likelihood or potential for audio feedback, so that the user can take the steps necessary to prevent such audio feedback before the feedback occurs.

Speech recognition programs use standard microphone input to obtain data to convert to text. However, other kinds of audio input devices must now be accommodated, and users must be able to select from multiple audio input sources. These sources can even include recorded data files in multiple formats. The ability to convert standard windows audio files(.WAV) to text has been demonstrated. Even so, the user must still manually convert the recorded data from the input device in the .WAV format before using another software application to convert the audio data into text. There is a need for a method and apparatus for simplifying the selection of many input audio devices and the processing of their respective output signals in many file formats, not just the .WAV format.

Use of the wrong audio device, or source, in the first instance, is another potential problem occasioned by the availability of multiple audio input devices. Connecting the wrong audio input device can cause the set up procedure to fail. In such a case, there is a need for a method and apparatus to guide a user through the procedure for changing the audio input device when it appears that such a wrong connection is the cause of the set up failure.

SUMMARY OF THE INVENTION

The a need for a method and apparatus for simplifying the selection of many input audio devices and the processing of their respective output signals in many file formats is satisfied by the inventive arrangements taught herein.

A method for enabling user selectable input devices for dictation or transcription in a speech application, in accordance with the inventive arrangements, comprises the steps of: establishing a registry of dictation and transcription device descriptions, each of the descriptions including a device specific image, a device specific set of device-connecting instructions and a device specific list of audio configuration parameters; building dynamic tables containing information retrieved from the registry; establishing and storing a plurality of enrollments, each of the enrollments representing a speech file of user specific training data corresponding to at least one of a specific audio input device and a specific audio environment; and, generating a graphical user interface (GUI) display screen using the information in at least one of the dynamic tables to enable user selection any input device in the registry for which one of the enrollments is available, for use as a dictation or transcription input to the speech application.

The method can comprise the step of including in the GUI display screen a plurality of nested menus for identifying each the enrollment for each the device and enabling the user selection.

The method can further comprise the step of identifying sets of compatible devices in the registry and in the dynamic tables.

The method can further comprise the steps of: searching for an enrollment with a compatible device when a user selects a device without a corresponding enrollment; and, automatically using information from the compatible device to enable initiation of a dictation or transcription session without a training session.

The method can further comprise the steps of: identifying sets of compatible devices in the registry and in the dynamic tables; and, displaying each the set of the compatible devices in the GUI display screen menus as a single selectable item.

The method can comprise the step of storing text from recognized speech in a single document irrespective of the recognized speech being dictated directly to the speech application or played back from a transcription device.

A computer apparatus programmed with a routine set of instructions stored in a fixed medium, for enabling user selectable input devices for dictation or transcription in a speech application, in accordance with the inventive arrangements, comprises: means for establishing a registry of dictation and transcription device descriptions, each of the descriptions including a device specific image, a device specific set of device-connecting instructions and a device specific list of audio configuration parameters; means for building dynamic tables containing information retrieved from the registry; means for establishing and storing a plurality of enrollments, each of the enrollments representing a speech file of user specific training data corresponding to at least one of a specific audio input device and a specific audio environment; and, means for generating a graphical user interface (GUI) display screen using the information in at least one of the dynamic tables to enable user selection any input device in the registry for which one of the enrollments is available, for use as a dictation or transcription input to the speech application.

The GUI display screen includes a plurality of nested menus for identifying each the enrollment for each the device and enabling the user selection.

The apparatus can further comprise means for identifying sets of compatible devices in the registry and in the dynamic tables.

The apparatus can further comprise: means for searching for an enrollment with a compatible device when a user selects a device without a corresponding enrollment; and, means for automatically using information from the compatible device to enable initiation of a dictation or transcription session without a training session.

The apparatus can further comprise: means for identifying sets of compatible devices in the registry and in the dynamic tables; and, means for displaying each the set of the compatible devices in the GUI display screen menus as a single selectable item.

The apparatus can further comprise means for storing text from recognized speech in a single document irrespective of the recognized speech being dictated directly to the speech application or played back from a transcription device.

BRIEF DESCRIPTION OF THE DRAWINGS

FIG. 3 is a flow chart useful for explaining architecture setup for maintaining input device identity.

FIG. 4 is a flow chart useful for explaining user flow for the architecture shown in FIG. 3.

FIG. 5 is a flow chart useful for explaining input device association setup.

FIG. 6 is a flow chart useful for explaining user flow and automatic configuration for a selected input device.

DETAILED DESCRIPTION OF THE PREFERRED EMBODIMENTS

Figure 1:
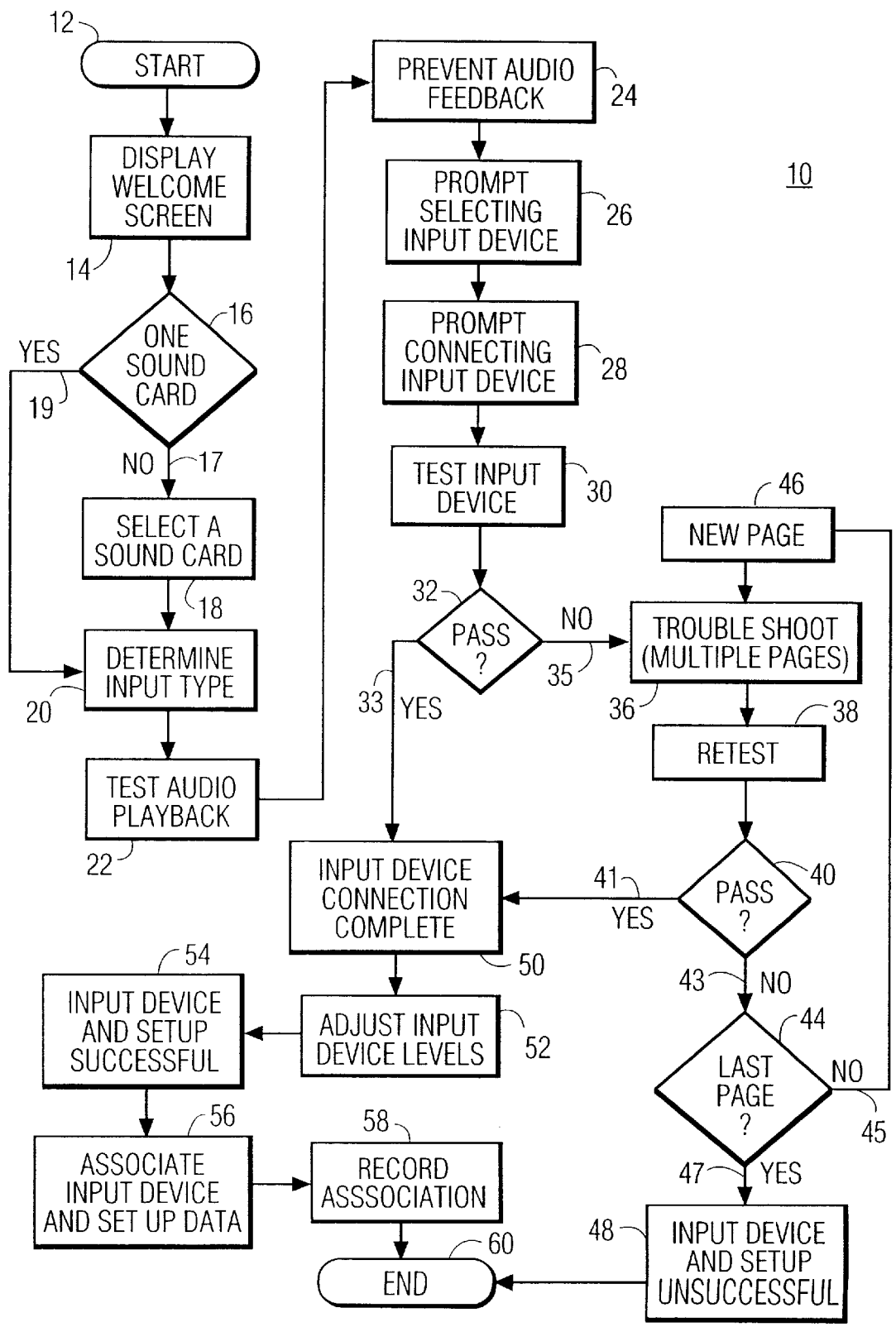
FIG. 1 is a flow chart useful for explaining connecting and optimizing input devices.

An overall method for connecting and optimizing audio input devices for speech applications, for enabling users selectable input devices for speech applications, for maintaining input device identity in speech applications, for preventing audio feedback while executing the speech application in a pro-active manner and for trouble shooting problems in connection with the foregoing, in particular for trouble shooting wrong audio sources, is illustrated by flow chart 10 in FIG. 1. The method starts in block 12, and proceeds by displaying a welcome screen in connection with the step of block 14, the welcome screen providing a brief introduction to the program.

In accordance with the decision step of block 16, a determination is made as to whether the speech application has access to more than one sound card. If the user has two or more sound cards that support speech recognition, the user will be presented with a GUI screen, not shown, for selecting one of the sound cards. This screen allows the user to select which sound card will be use for input, that is recording, and which sound card will be used for output, that is playback. If more than one sound card is available, the method branches on path 17 to the step of block 18 in accordance with which a sound card is selected. Thereafter, in accordance in the step of block 20, the type of the input device is determine, for example by users selection, command line parameters, registry entries and or queries from users specific data, such as enrollment identifications. If there is only one sound card, the method branches on path 19 directly to the step of block 20.

After the input type has been determined, the audio play back level is tested and adjusted to a comfortable setting in accordance with step of block 22. The user is instructed to connect the device in preparation for the testing in the Connecting the Input Device screen shown in FIG. 8. This is also configurable with respects to the instructions and/or bitmap image that is displayed on the screen. Audio feedback can be proactively prevented in accordance with the step of block 24, by prompting the user to select one or more switch settings which can be expected to prevent audio feedback in the first instance. Alternatively, the user can choose to use the default settings.

Figure 8:
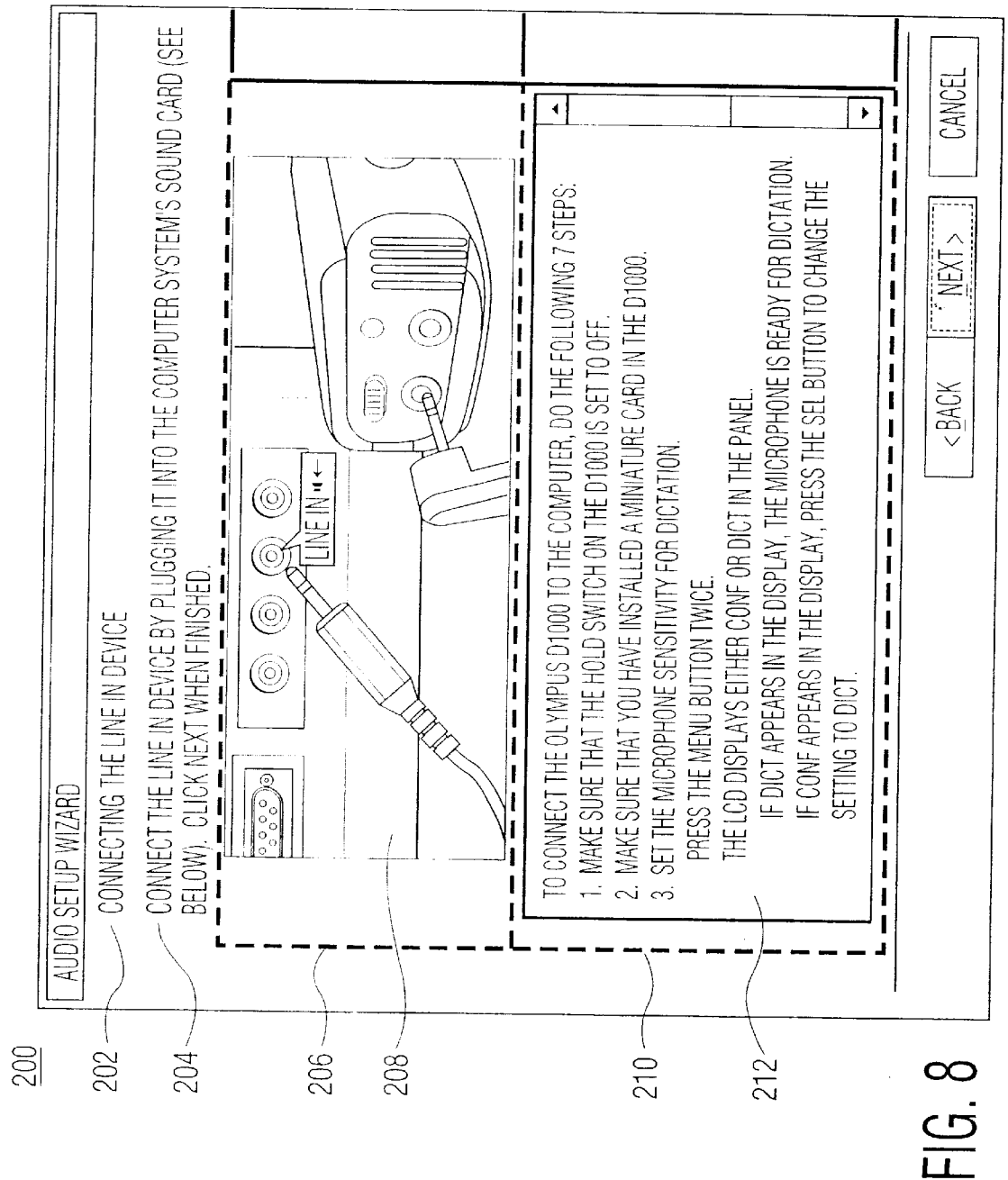
FIG. 8 is an example of a configurable display screen, in this case for connecting a line in device.

The user is prompted to select a input device in accordance with the step of block 28, and thereafter, is prompted to connect the input device in accordance with the step block 28. The display screens associated with steps of blocks 22, 24, 26 and 28 can be configured with respect to instructions, bitmap images and other information useful for assisting the user. An exemplary display screen 200 is shown in FIG. 8. Screen 200 has a title 202 identifying the screen, a general instruction 204, an area 206 having a device specific bitmap 208 illustrating device specific hardware and connections and an area 210 for displaying detailed, device specific instructions 212.

Figure 9:
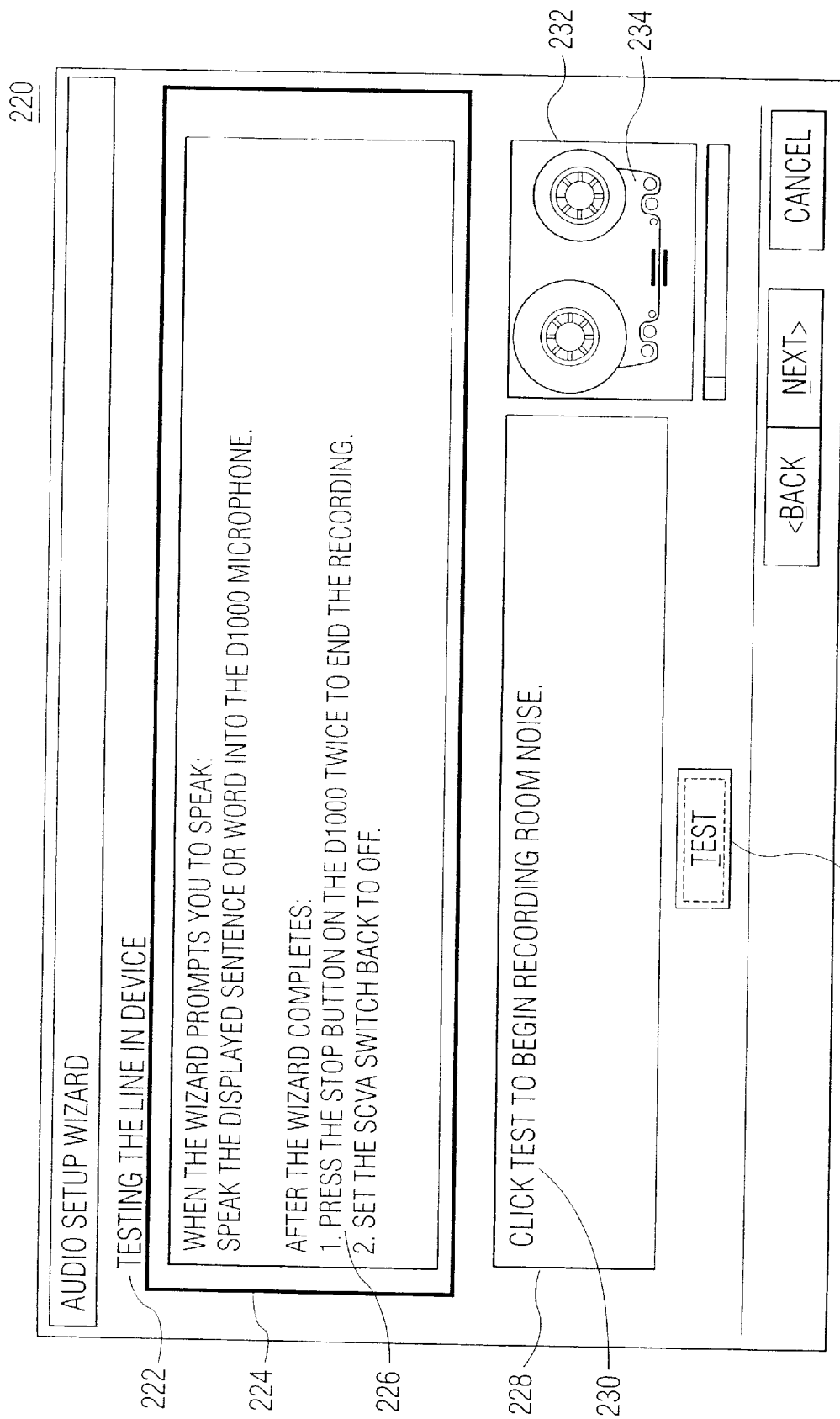
FIG. 9 is an example of a configurable display screen, in this case for testing a line in device.

The foregoing steps place the audio input device in the condition for testing the audio. Such a test usually requires two short audio recordings, one to record background noise and the other to record a speech selection. Instructions for testing the line in device can be provided by a display screen 220 as shown in FIG. 9. Screen 220 has a title 222, an area 224 for displaying device specific testing instructions 226, an area 228 for displaying general instructions 230, that is instructions which are not device specific, an area 232 for providing visual feedback, for example an animated icon 234 of a tape recorder and at least one activatable icon 236, for example a button, for initiating the test procedure in accordance with the general and device specific instructions.

If the test is successful, in accordance with step of decision block 32, the method branches on path 33 to step 50, in accordance with which a screen is displayed informing the user that connection of the input device have been completed. Thereafter, the input device level can be adjusted in accordance with step 52, and a further screen can be displayed advising the user that the input device and setup has been successful, in accordance with step 54.

In view of the need to efficiently manage multiple input devices, an association is made in accordance with step 56 between the tested input audio device and all of the setup data associated with connecting, testing and adjusting the input level of the device. The association is recorded in accordance with the step 582, and the method ends with step 60.

If testing of the input device in accordance with the step decision block 32 is not successful, the method branches on path 35 to the trouble shooting step of block 36. A number of possible problems can result in failure of the input device test, including for example, selection of the wrong sound card, selection of the wrong audio input device, loose plugs, selection of the wrong jack, improper setting of mute switches, battery problems with microphones and adapters, environments with high background noise, improper adjustment of audio parameters and the presence of disruptive audio feedback. Depending upon how many problems are detective or appear to be possible or probably, the method branches path 35 through a number of pages or display screens in accordance with step 36 so that one or more screens can be displayed to assist the user in trouble the problem or problems.

More particularly, the first appropriate trouble shooting page or screen will be displayed and the user will be prompted to make various adjustment. These screens can also be configured with respect to the instructions and bitmap images displayed on the screens. After each page, the input device can be retested in accordance with step 38. If the retest is not successful in accordance with decision step 40, the method branches on path 43 to decision step 44. If the last trouble shooting page has not been processed, the method branches on path 45 back step 46, in accordance with which a new trouble shooting page is displayed and processed.

If a retest is successful in accordance with decision step 40, the method branches on path 41 to step 50, already explained above.

If the retest of the last page has failed, in accordance with decision step 44, the method branches on path 47 to step 48, in accordance with which a screen displayed advising the user that input device connection and setup has been unsuccessful. Suggestions for user actions can be provided, for example, having the input device independently tested, or selecting a new input device and resuming the procedure, for example at step 20.

The speech application, and in particular the speech recognition engine, can be trained for different input devices, for example a microphone or a line-in device. The system can also be trained for different environments, for example quiet or noisy. This gives the user the flexibility to optimally tailor the system to their particular needs. However, performance and accuracy can suffer severely if the speech recognition engine is using a particular set of training data that does not correspond correctly to the current digitized signals generated by the sound card. This can easily occur if the user accidentally mismatches the input device with the selected training data.

In accordance with the inventive arrangements, the correct association between a user's training data and its corresponding input device can be advantageously maintained by associating a particular input device to the user and/or to the enrollment. An enrollment represents a set of training data. This association could be implemented in a number of ways. One such way is to embed this information inside one of the user's speech files or centrally located it in a system wide database, for example a Windows Registry as explained below.

When a user changes to another user or to another enrollment for the same user, the system is programmatically configured for the associated input device. This configuration can be, but is not limited to, selecting the correct input line and setting the input gain to an optimal level for that particular user and/or environment and/or input device combination. This can ensure that the proper input device, based on the current user/enrollment, is selected for input into the speech application. Moreover, steps can be taken to assure that other input lines from other connected devices are not selected, for example by muting, so that they do not contribute to the input signal. A corrupted and/or improperly mixed audio signal that is passed on to the speech recognition software would have detrimental effects on the performance and accuracy the system. Advantageously, the user is not burdened by the need to configure the audio system when changing between users and/or enrollments.

Figure 2:
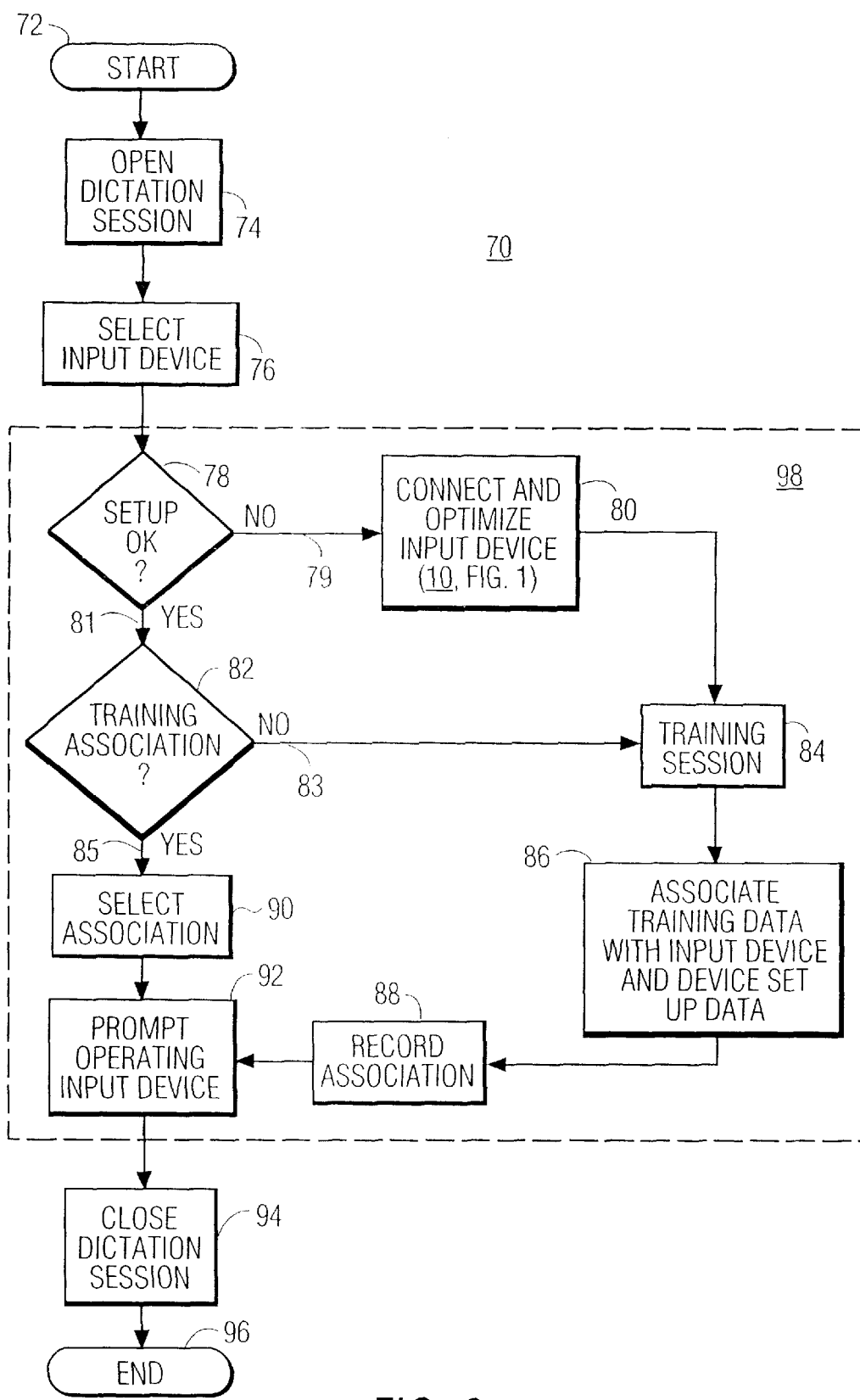
FIG. 2 is a flow chart useful for explaining the association of training data and input devices.

A process 70 for illustrating how such associations can be advantageously implemented is shown in FIG. 2. From start block 72, a dictation session is opened in accordance with step 74. An input device is selected in accordance with step 76. The setup for the selected device is checked in accordance with decision step 78. If the setup is OK, the method branches on path 81 to the step of decision step 82, which determines if a training session has been associated with the selected and properly set up device. If an association is available, the method branches on path 85 to step 90, in accordance with which the association for the input device is selected. The user is then prompted to operate the input device in accordance with step 92.

If the setup in decision step 78 is not OK, the method branches on path 79 to step 80, which represents the connecting and optimizing process 10 shown in FIG. 1. A training session is then undertaken in accordance with step 84. If there is no associated training session in decision step 82, the method branches on path 83 to the training session of step 84. After the training session, the training data is associated with the selected input device and the device setup data in accordance with step 86. The association is recorded in accordance with step 88, making the association available for recognition in step 82 the next time a dictation session is opened with the associated input device.

After dictation or transcription from a line in device, the dictation session is closed in accordance with step 94 and the process ends at step 96.

The dashed line box in FIG. 2 denotes a path 98, the steps of which are incorporated into a flow chart 380 explained later in connection with FIG. 19.

A number of shorter processes can be defined for understanding the manner in which input device identity can be maintained in accordance with the inventive arrangements. In architecture setup process 110 shown in FIG. 3, one or more input devices are installed. A record is added to the database for each device in accordance with step 114. Each added record is filled with device specific information in accordance with step 116.

In process 120 shown in FIG. 4, the user initiates the process of changing the device in accordance with step 122. The application queries the data base for a list of available devices in accordance with step 124. The user selects a device from the list in accordance with step 126. The system automatically configures for the new device based on the data base information, in accordance with step 128.

In input device association setup process 130 shown in FIG. 5, a user file is created in accordance with step 132. An association is set up between the user file and the input device settings, in the registry or by embedding in the user file, in accordance with step 134.

In user flow process 140 shown in FIG. 6, an input device is selected in accordance with step 142. An association is retrieved from the user file or the data base in accordance with step 144. The GUI is changed according to the selected input device in accordance with step 146. The audio mixer input is configured in accordance with step 148. The audio mixer gain is configured in accordance with step 150. Other device specific information is configured in accordance with step 152.

A device can be represented to a speech application, in accordance with the inventive arrangements, by a data block that identifies the attributes which make up the device. In the presently preferred embodiment, the data block defining a device exists in the Windows registry. Table 1 is a description of the data block as it exists in the registry with a description of each of the attributes. The following registry keys are specified by the device manufacturer. A full file path/name is exemplified by HKLM\SOFTWARE\IBM\-VOICETYPE\AUDIO\DEVICES\<Device Key Name>.

TABLE 1

| Registry Key | Definition |
|---|---|
| <Device Key Name> | Key name used to identify which DLL should be used for transcription in the transcription request message. |
| AUDIODEVINFOVERSION | "<Version # of audio device info>" This should be a string set to "1.0", for example, for the first version. |
| DICTATIONDEVICETYPE | "<Type of device used for dictation>" The audio device which should be used during dictation/transcription. Possible values are Microphone, Line-In, and Custom. |
| ENROLLDEVICETYPE | "<Type of device used for enrollment>" The audio device which should be used during enrollment. Possible values are Microphone, Line-In, and Custom. |
| ENROLLDEVICE | "<Audio DLL name for enrollment>" The name of the audio DLL used for enrollment. |
| AUDIOSETUPDEVICETYPE | "<Type of device used for microphone/audio setup>" The audio device which should be used during microphone/audio setup. Possible values are Microphone, Line-In, and Custom. |
| AUDIOSETUPDEVICE | "<Audio DLL name for microphone/audio setup>" The name of the audio DLL used for microphone/audio setup. |
| ENROLLSAMPLINGRATE | "<Sample rate of the enrollment>" The sampling rate of an enrollment for this device. Examples are "8", "11" and "22" (thousand samples per second) |
| DEFAULTRECORDLEVEL | DWORD <Default mixer setting for this device> This is the default mixer setting for this device. Device manufacturers will be provided with this value, which should be stored as a DWORD registry value. |
| AUDIOSETUPFORDICTATION | DWORD (0 or 1) A value of 1 means that the audio setup should be run when being called from a dictation application. A value of 0 means that it should not. A file device can have an audio setup connection of Line-In, for example, but when transcribing a file into a dictation application, it is undesirable to switch the mixer controls to the Line-In. |
| AUDIOSETUPFORENROLLMENT | DWORD (0 or 1) A value of 1 means that the audio setup should be run when being called from a dictation application. A value of 0 means that it should not. A file device can have an audio setup connection of Line-In, for example, but when transcribing a file into a dictation application, it is undesirable to switch the mixer controls to the Line-In. |
| COMPATIBLEDEVICES | "List of device keys compatible with this device" |
| \EN_LANG_ID | The key which contains the language specific information for the device. Exemplary key names are EN_US, EN_UK, EN_DE, etc. |
| \EN_LANG_ID \SELECTFILEDLLNAME | "<Your select file DLL Name>.DLL" The name of the DLL containing the exported function which provides the open file dialog functionality for files of the given device type. |
| \EN_LANG_ID \SELECTFILEFUNCTION | "<Function name exported>" The name of the function exported which provides the open file dialog functionality for files of the given device type. |

TABLE 1-continued

| Registry Key | Definition |
| --- | --- |
| \EN_LANG_ID \DESCRIPTIONTEXT | "<Text to appear in dictation menu>" This is the text that describes the audio device. This text is used when a description of the device is required. It will be displayed in the Dictation menu of SpeakPad for the File Transcription option, when creating a new enrollment, and in the control panel applet when selecting a different enrollment. |
| \EN_LANG_ID \HELPMENUITEMTEXT | "<Text to appear in help menu>" The text which will appear in the Help menu of SpeakPad, for example. When this menu item is selected, the help file found in the HELPFILEPATH registry value will be executed. |
| \EN_LANG_ID \HELPFILEPATH | "<Full Path to your help file>" The full path to the help file which will be executed when the HELPMENUITEMTEXT item is selected. This help file should contain information unique to using SpeakPad, for example, with a specific manufacturer's device. |
| \EN_LANG_ID \ERRMSGXXX | "<Error text for error num XXX>" The text for the error message associated with value XXX. |
| \EN_LANG_ID \AUDIOSETUPFILLERBMP | "<BMP for Audio Setup>" The full path to BMP file displayed on Audio Setup main screen. |
| \EN_LANG_ID \AUDIOSETUPCONNECTIONRTF | "<RTF for Audio Setup>" The full path to RTF files displayed on the Audio Setup connection description screen. |
| \EN_LANG_ID \AUDIOSETUPCONNECTIONBMP | "<RTF for Audio Setup>" The full path to BMP file displayed on the Audio Setup connection description screen. |
| \EN_LANG_ID \AUDIOSETUPTESTRTF | "<RTF for Audio Setup>" The full path to RTF files displayed on the Audio Setup test screen. |

Figure 7:
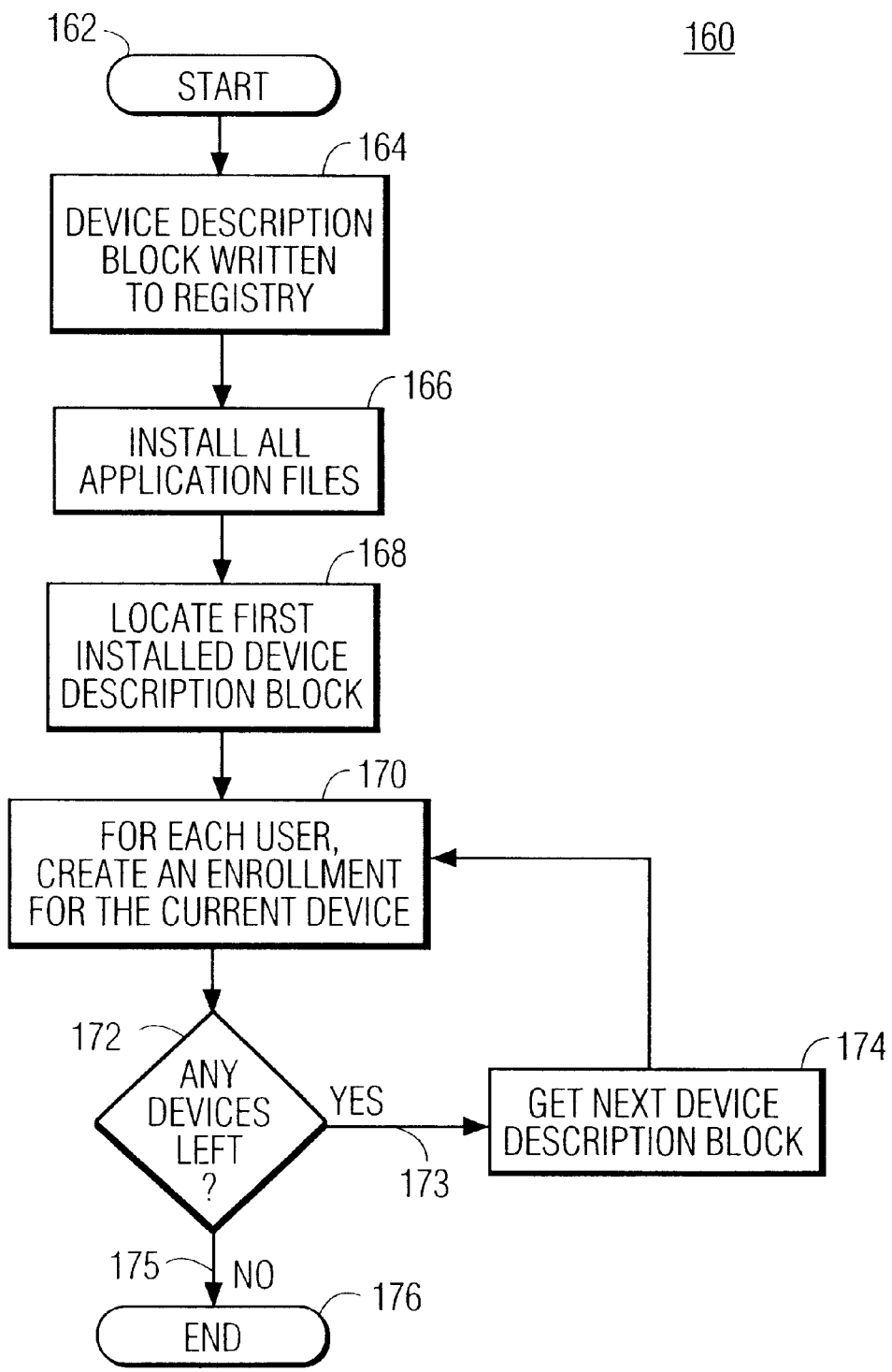
FIG. 7 is a flow chart useful for explaining creation of enrollments using device description blocks.

The input device installation method is illustrated by process 160 in FIG. 7. From start block 162, a device description block is written into the registry in accordance with step 164. The device description block attributes must be created by the manufacture of a new device. The speech application, for example ViaVoice, will use the device description block to determine how to interact and manage this new input device. It will be the responsibility of the device manufacturer to create the device description block in the registry with the correct values.

The application files are installed in accordance with step 166. When the speech application installs, the application will process each of these device blocks. The first installed device description block is located in accordance with step 168. For each user, an enrollment is created for the current device, in accordance with step 170. A determination of whether any device remain is made in accordance with decision step 172. If any devices are left, the method branches on path 173 to step 174, in accordance with which the next device description block is retrieved. An enrollment is then created for the newly current device in accordance with step 170. The loop continues until no devices are left. When no devices are left, the method branches on path 175 and ends at step 176.

The process advantageously creates an enrollment representing each device located in the system for each user installed in the system. This allows a user access to the device without having to manually create an enrollment for the device.

The process for enrollment allows the user to train the system to improve accuracy. This needs to be done for each individual device. Some devices, however, have multiple configurations which can appear as different devices to the speech application, but actually use the same enrollment data. These devices are tied together using the COMPATIBLEDEVICES attribute of a device description block, listed above in Table 1. Devices that are compatible with each other advantageously appear as a single option to the user. This allows the users to enroll for one device, and use the same enrollment for the devices that are compatible with it. When creating a new enrollment, the user is presented with a list of devices to choose from. The compatible devices are tied together as a single entry. The user selects the device to enroll for, and then the enrollment proceeds using the selected device. The compatible device attribute of the device description block lists all the compatible device with which the device can share an enrollment. The text items displayed to the user describing the device are obtained from the attribute DESCRIPTIONTEXT, and is unique for each language installed on the system.

After the device is selected, the audio hardware needs to be configured so that audio settings are optimal for speech recognition. This is accomplished using the speech application's audio setup procedure, the details of which are not pertinent herein, but which can correspond to commercial versions of IBM's ViaVoice. The device block attribute AUDIOSETUPFORENROLLMENT is checked to determine when an audio setup is required to enroll for the selected device. If the value is 1, audio setup is run for the selected device. If the value is 0, then audio setup is not executed.

After audio setup is complete, the enrollment process begins. Part of this process is configuring the speech recognition engine to use the correct audio DLL for obtaining audio data from the selected device. The configuration information is obtained from the device description block attribute ENROLLDEVICE. This attribute specifies the name of the customized audio DLL required to obtain the enrollment audio data from the device. From this point, the enrollment proceeds normally, as for example in any ViaVoice enrollment process. During the enrollment process, if the user requires help using the device, a menu item can be used to obtain help for the device. The menu item text and the help file that is displayed are retrieved from the attributes HELPMENUITEMTEXT an d HELPFILEPATH respectively.

Each enrollment in the system is tagged to belong to a specific device. The information stored in each of the enrollment files is shown in Table 2.

TABLE 2

| Tag | Definition |
| --- | --- |
| AudioDeviceKey | The value of this field is the device key which uniquely identifies a transcription device in the ViaVoice system. |
| CompatibleTag | This is a number which correlates compatible enrollments with one another. When a new enrollment is created, a new unique CompatibleTag number is generated. This value is stored in each enrollment created for each compatible device. This allows compatible enrollments to be associated with one another to ensure the correct values are used during transcription. |

Figure 10:
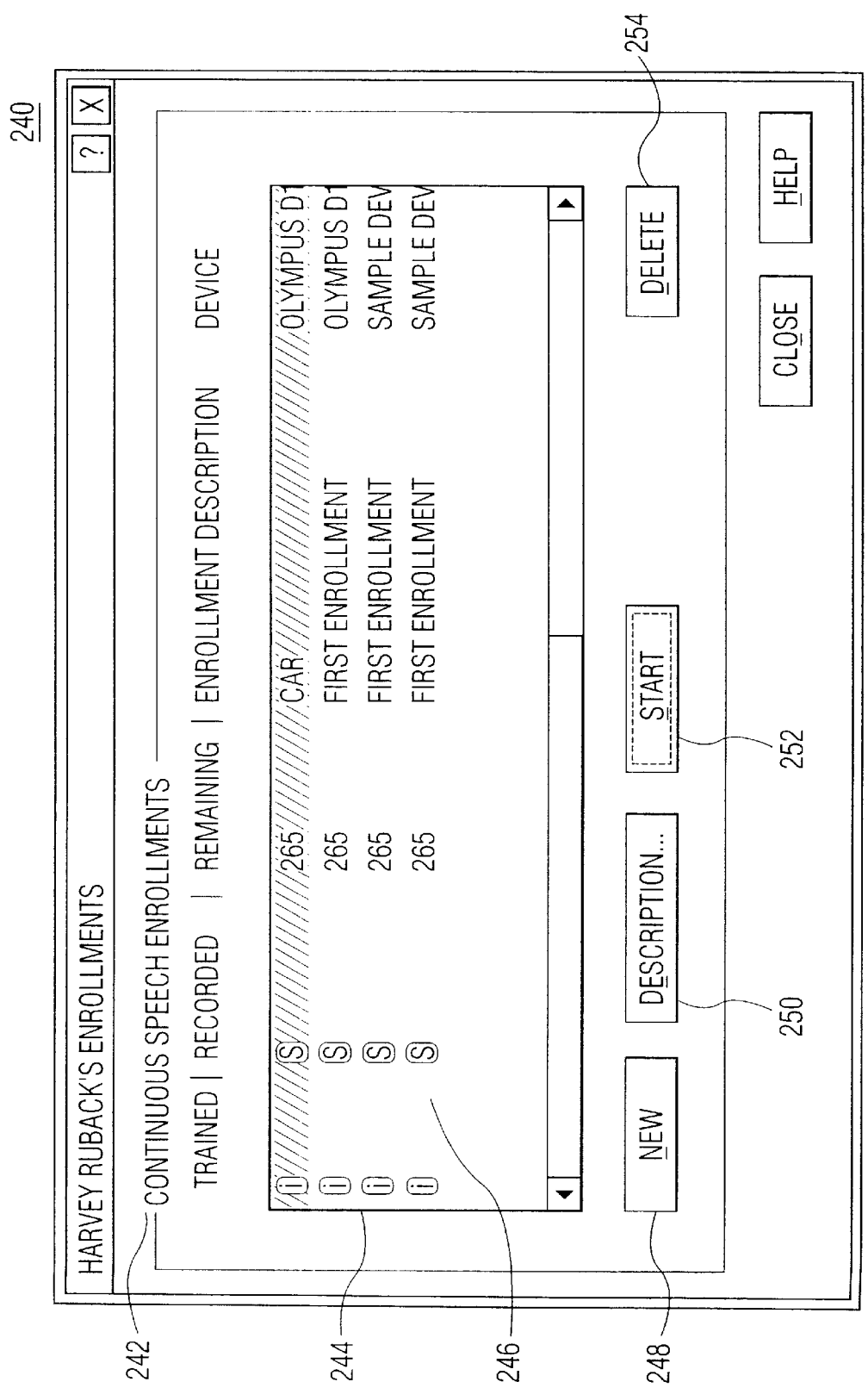
FIGS. 10 and 11 are two views of an example of a display screen useful for explaining managing enrollments.
Figure 11:
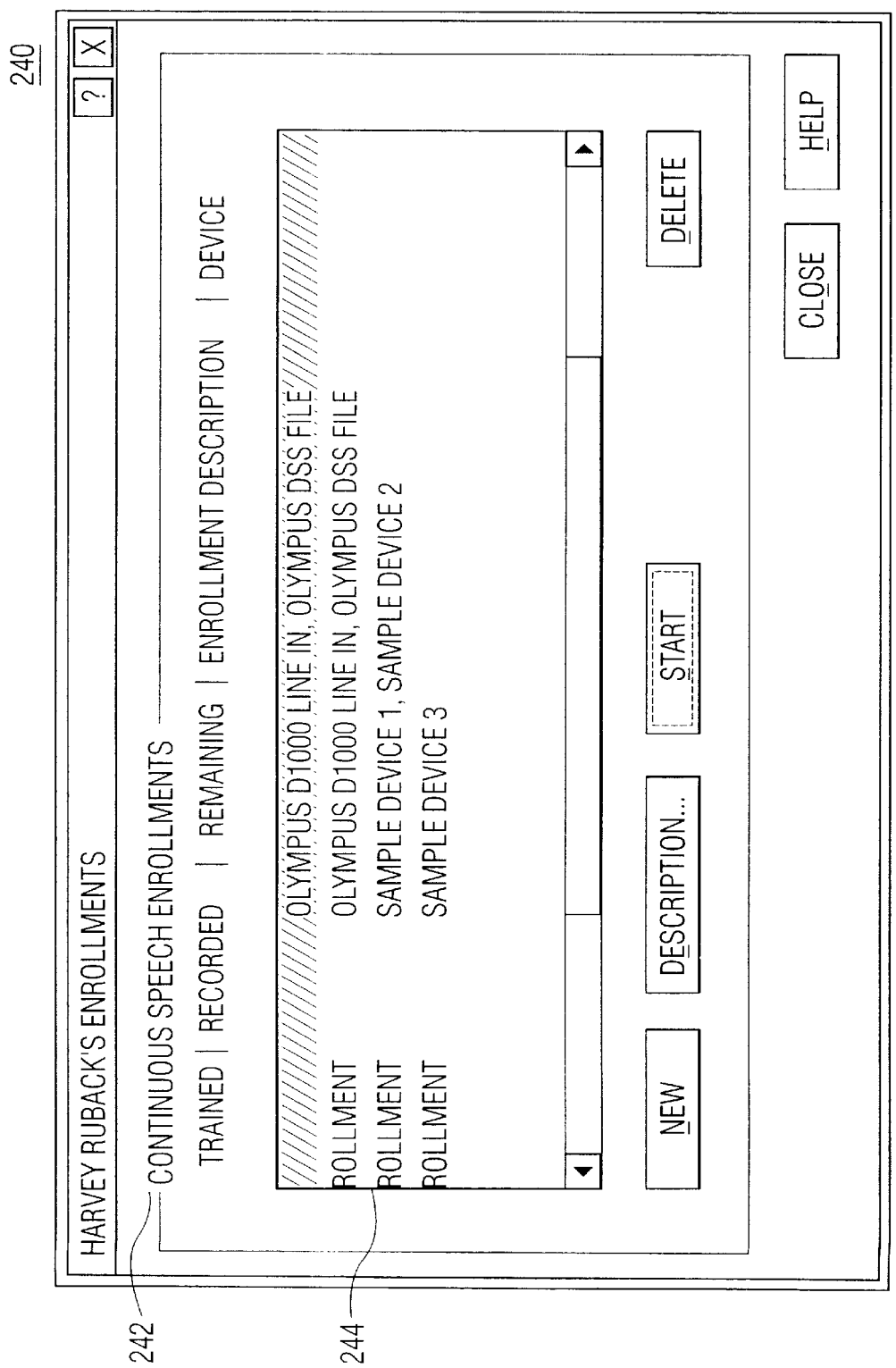

The screen display 240 in FIGS. 10 and 11 shows the enrollment for a user named Harvey Ruback. The screen has a title 242 and a data display area 244 for a list 246 of enrollments for the user. The data display area 244 is scrolled to the right in FIG. 10 and to the left in FIG. 11 to show the individual enrollments for compatible devices. The first two enrollments in the list 246 are values for the Olympus D1000 Line and DSS File devices. The first enrollment in the list is different than the second enrollment because the noise environment is different in a car. The third enrollment is valid for both Sample Devices 1 and 2. Finally, the fourth device is only valid for Sample Device 3. Activatable icon buttons 248, 250, 252 and 254 are provided to add, describe and delete enrollments, and to start a selected enrollment.

Figure 12:
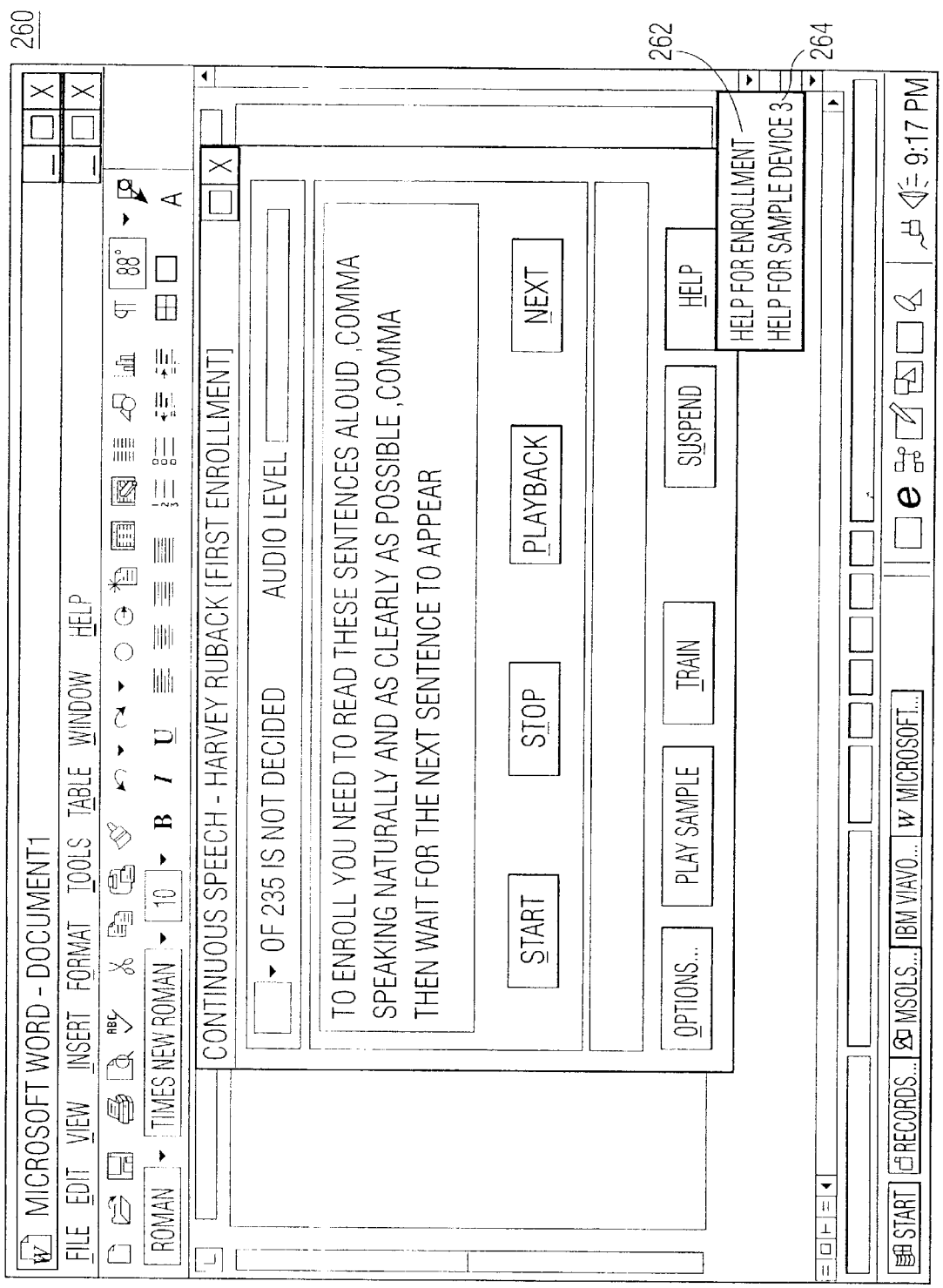
FIG. 12 is an example of a display screen useful for explaining help menu item text during an enrollment.

The display screen 260 shown in FIG. 12 illustrates the Help menu item text during an enrollment for Sample Device 3. Device specific text is extracted from the data base. Different text can therefore be extracted for other devices, for example as text 262 for enrollment and text 264 for Sample Device 3.

Figure 13:
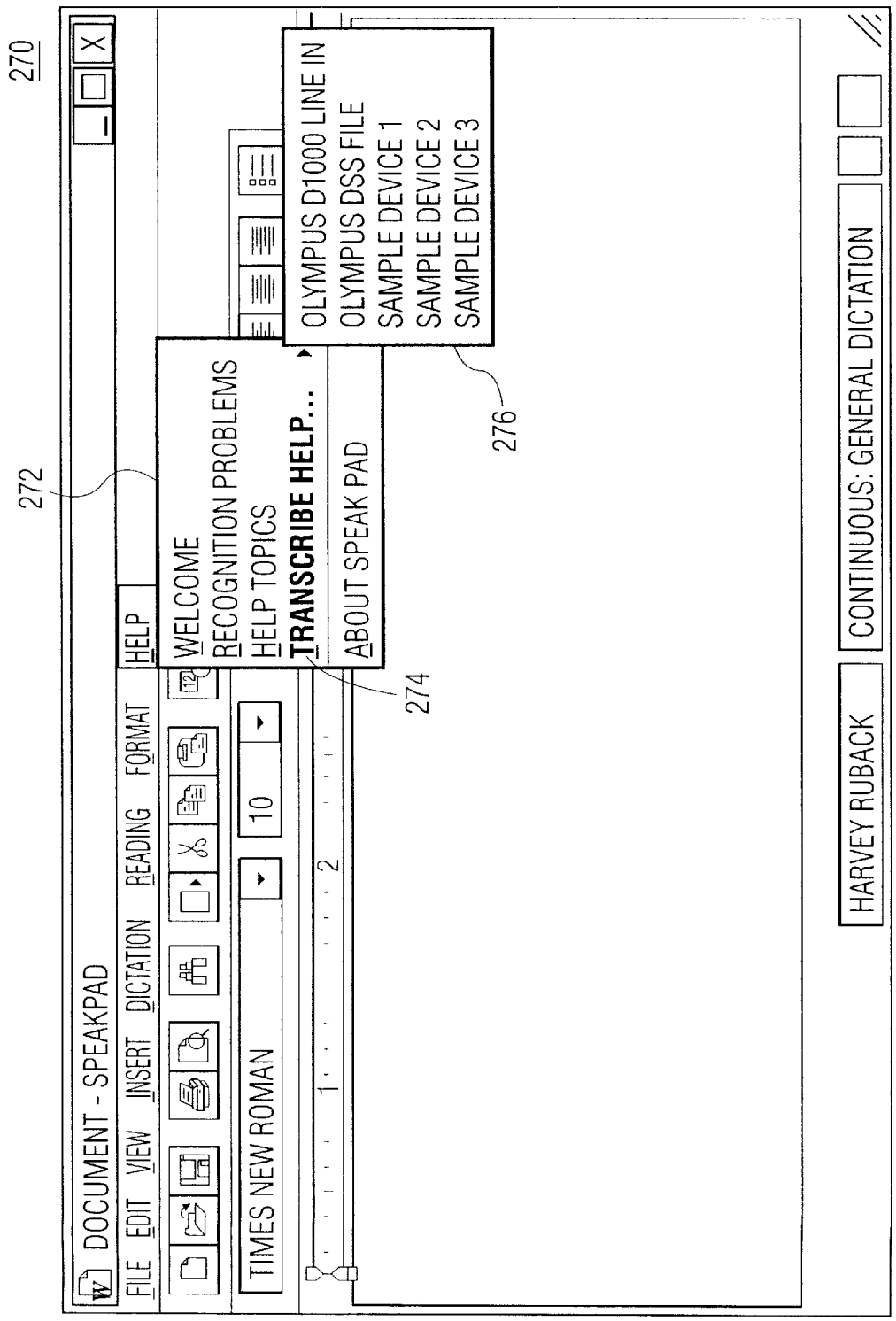
FIG. 13 is an example of a display screen useful for explaining transcribe help menu selections.

In general the menu items are retrieved from the data base when the speech application, for example SpeakPad, is started. The DESCRIPTIONTEXT attribute of each device registered in the system is used to create the menu list of devices used in the Help/Transcribe Help menu. The menu item text is obtained from the device description block attribute DEVICEDESCRIPTION. For each device, a list of enrollments for the current user is created which are compatible with the device. An enrollment associated with a device when the device key is found in the AudioDeviceKey of the enrollment identification file. For each device, an item is added to the transcribe help menu. The help file and menu item text are obtained from the device description attributes HELPMENUITEMTEXT and HELPFILEPATH respectively. When a user chooses to transcribe from an input device, the device is selected from the "transcribe from" menu item in a screen 270 as shown in FIG. 13. A help pull down menu 272 includes an item 274 for Transcribe Help. Selection of Transcribe Help item 274 initiates a display of a second pull down menu 276. Menu 276 includes five transcription devices, corresponding to those in list 246 in screen 240 in FIGS. 10 and 11.

Figure 14:
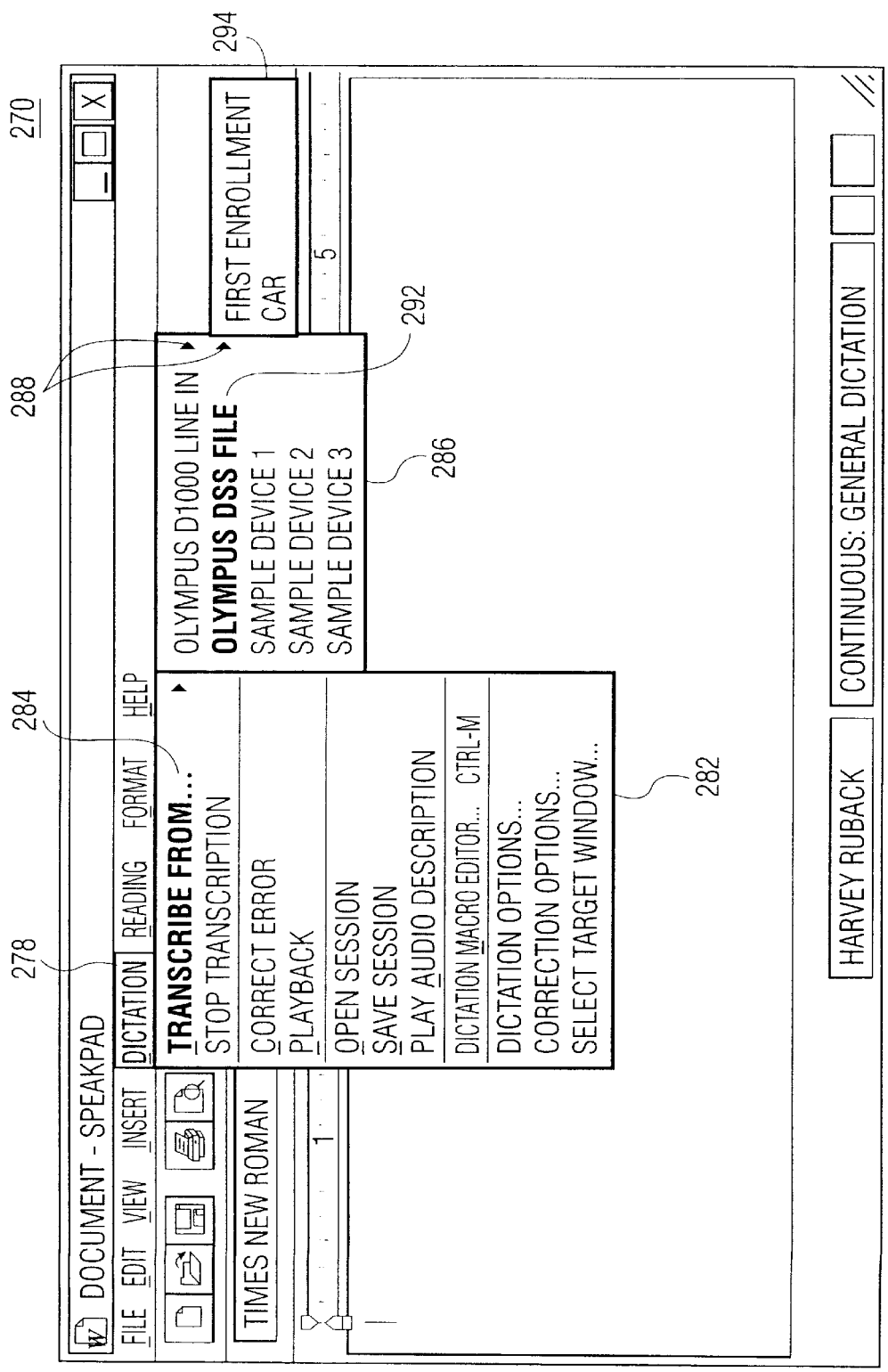
FIG. 14 is an example of a display screen useful for explaining dictation menu selections.

Another view of screen 270 in FIG. 14 shows that selection of the Dictation menu 278 initiates a pull down menu that includes a Transcribe From menu item 282. Selection of Transcribe From menu item 284 initiates a menu 286 listing the five enrolled transcription devices. The Olympus devices each have at least 2 enrollments, indicated by the right hand facing arrows 288 indicative of another menu list for each item. Selection of the Olympus DSS File menu item 292 initiates a menu 294 listing the two enrollments for that device. The device is selected and then the enrollment is selected. Note that for Sample Device X, that is a Sample Device other than Sample Devices 1, 2 and 3, no enrollment is displayed. because only one enrollment exists for that device. The item is not displayed to save the user a selection.

Figure 19:
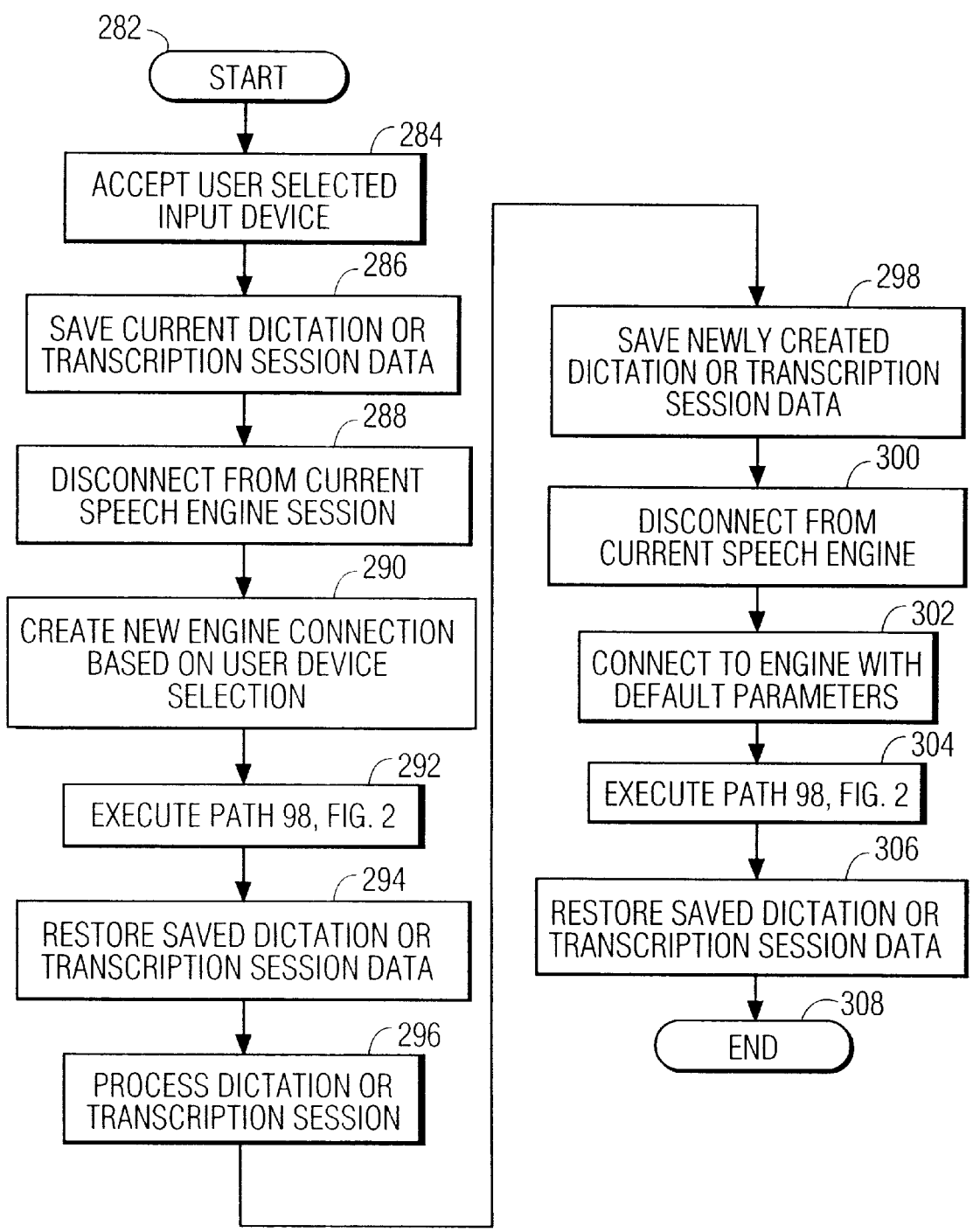
FIG. 19 is a flow chart useful for explaining the development of contiguous data in the same document from different input devices.

A flow chart useful for explaining the steps which need to be implemented to conduct a dictation or transcription session are shown in flow chart 380 in FIG. 19. The method starts at step 382. The speech application accepts a user selected input device, and enrollment, either implicitly or explicitly, in accordance with step 284.

The current dictation or transcription session data is saved to a temporary file in accordance with step 286. This data associates the text with the audio that was used to dictate or transcribe it. The current speech engine session is disconnected in accordance with step 288. The selected device's description block attributes are used to configure a new instance of the speech engine to obtain audio from the transcription device in accordance with step 290. The attributes used are DICTATIONDEVICETYPE and DICTATIONDEVICE. After the new engine connection is established, the AUDIOSETUPFORDICTATION attribute is checked to determine if audio setup must be requested to restore any previous audio configuration data to ensure an accurate transcription session. An example is having the line input gain restored if the device feeds the audio data to the engine through the PC line in connection. These steps are the equivalent of executing the steps of path 98 in FIG. 2, in accordance with step 292.

The previous dictation or transcription session data is restored in the context of this new engine connection in accordance with step 294. This allows the new data to be appended into the current text, advantageously creating one contiguous transcribed or dictated file, as the new dictation or transcription session is processed in accordance with step 296. After the dictation or transcription is complete, any of the text can be corrected rather than just the last transcribed text, in accordance with processing step 296. The audio data can be retrieved through the custom audio DLL specified by the device description block. The standard process of dictation proceeds, except the audio is being retrieved automatically without the user have to repeat it again. When all the audio data has been retrieved, the process can continue.

When the dictation or transcription session processing is concluded, the data currently in the dictation or transcription session is saved to a temporary file in accordance with step 298. The custom audio engine is disconnected in accordance with step 300. The speech engine is connected with the default parameters in accordance with step 302. This requires execution of the steps of path 98 shown in FIG. 2, in accordance with step 304. Audio setup is called to restore the audio settings for the default engine audio device. Finally, the dictation and/or transcription session data is restored in accordance with step 306, appearing as unitary text. The method ends at step 308.

Figure 15:
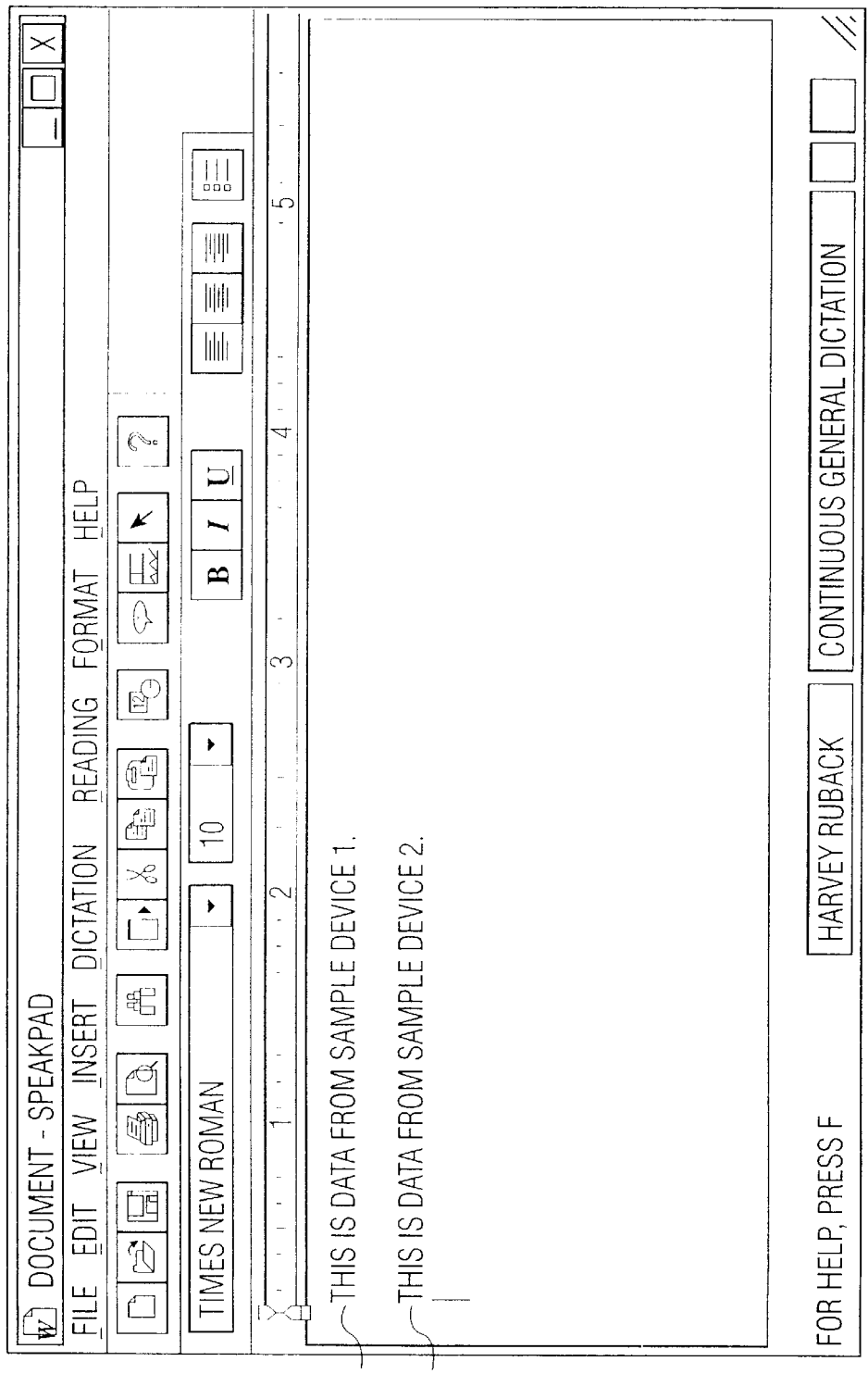
FIG. 15 is an example of a display screen after transcription is performed from two different devices.

The session now contains the data before the dictation or transcription started and the data just obtained from the input device, whether through dictation or transcription. Yet another version of screen 270 is shown in FIG. 15, which illustrates a situation after dictation and/or transcription is performed from two different devices. The first sentence 296 originated from Sample Device 1 and the second sentence originated from Sample Device 2. All of the data is contiguous in the document, and any of the data can be corrected, revised or otherwise edited.

Figure 16:
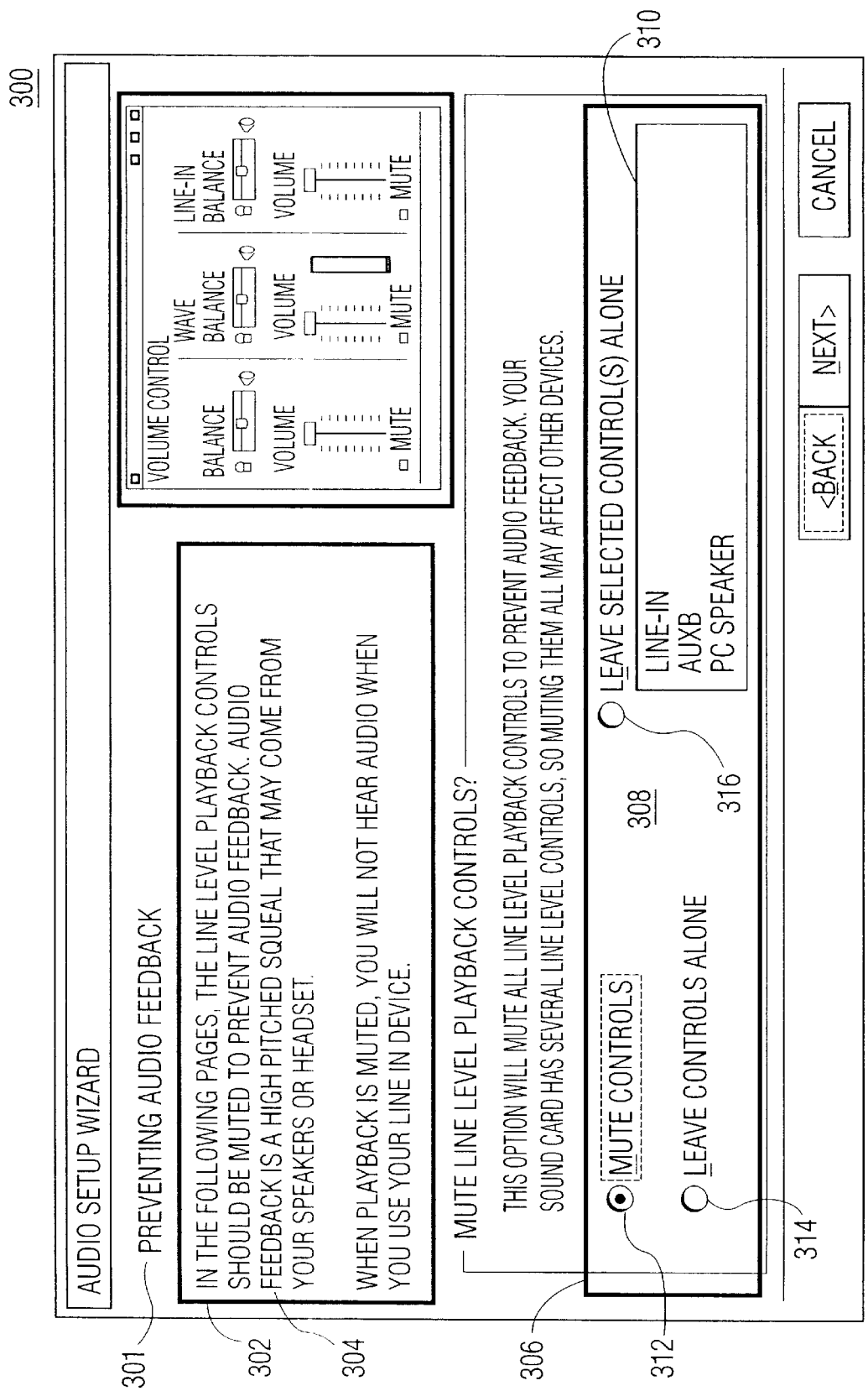
FIG. 16 is an example of a display screen for guiding a user through preventing audio feedback.

A Preventing Audio Feedback screen 300 is shown in FIG. 16 and identified by title 301. The screen 300 is divided into two main areas, an Information Area 302 for displaying information 304 about audio feedback and a User Control Area 306 for providing user controls 308 and a window 310 for listing audio mixer output controls. The user controls in this example include mutually exclusive selection circles 312, 314 and 316. Display screen 300 thus presents the user with a visual interface that allows the user to select one of several options to proactively prevent audio feedback. A first option is the use of Mute controls by activating selection circle 312. This option mutes the outputs of the audio mixer interface for all controls that could possibly be connected to the input device that is being setup and/or tested. This can be the default action, and thus guarantee that no audio feedback can occur. However, this option has the drawback of possibly muting wanted outputs. A second option is to leave the controls alone by activating selection circle 314. This option will leave the audio mixer interface in the state that it was found. This is useful for a knowledgeable user who has already configured the outputs of the audio mixer interface and wants it left alone. A third option is to leave selected controls alone by activating selection circle 316. This option allows the user the option of selecting those controls that are known not to be related to the input device being setup and/or tested. This gives a knowledgeable user the flexibility to configure the outputs of the audio mixer interface by selecting or deselecting the appropriate items in the list.

The solution to preventing audio feedback uniquely and advantageously provides an indication of a potential audio feedback problem, and thereafter, allows the user to select which audio mixer output controls should be muted, thus aiding in proactively preventing audio feedback. Although this aspect of the inventive arrangements is described in the context of a speech application, the method and accompanying display screen is useful for preventing audio feedback in any application, for example any audio or multimedia application, requiring audio input and output.

Figure 17:
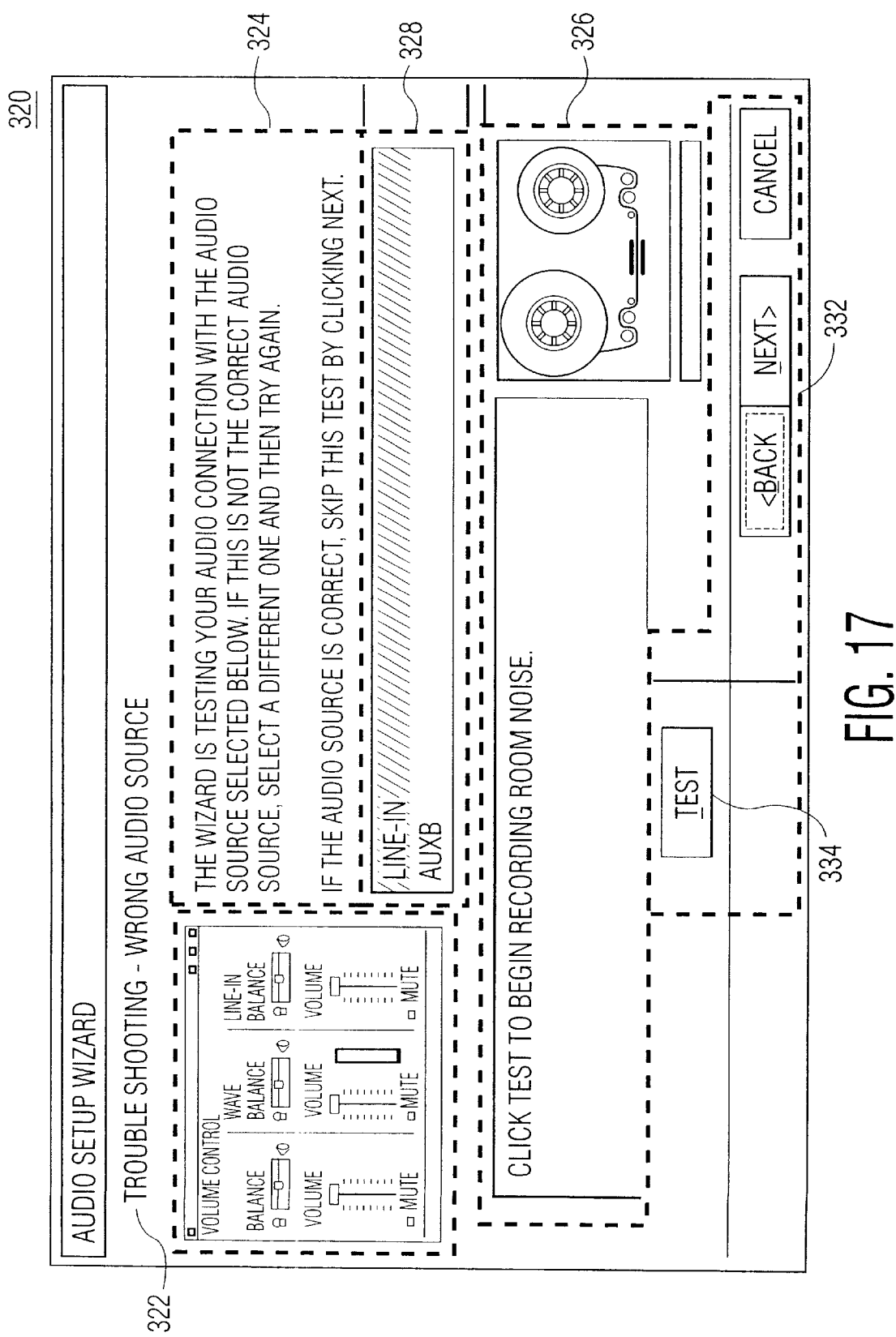
FIG. 17 is an example of a display screen for guiding a user through trouble shooting a wrong audio source.

A screen 320 for trouble shooting a wrong audio source is shown in FIG. 17. The screen is divided into four main areas, a Title area 322, an Information area 324, a Status area 326, a first User Control area 328 and a second User Control area 332. The Title area 322 is for displaying the title of the screen and/or the problem. The Information area 324 is for displaying information about the test. The Status area 326 is for displaying instructions and providing dynamic feedback and status information. The first and second User Control areas 328 and 332 are for providing user controls, such as buttons, selection boxes and pull down menus.

Figure 18:
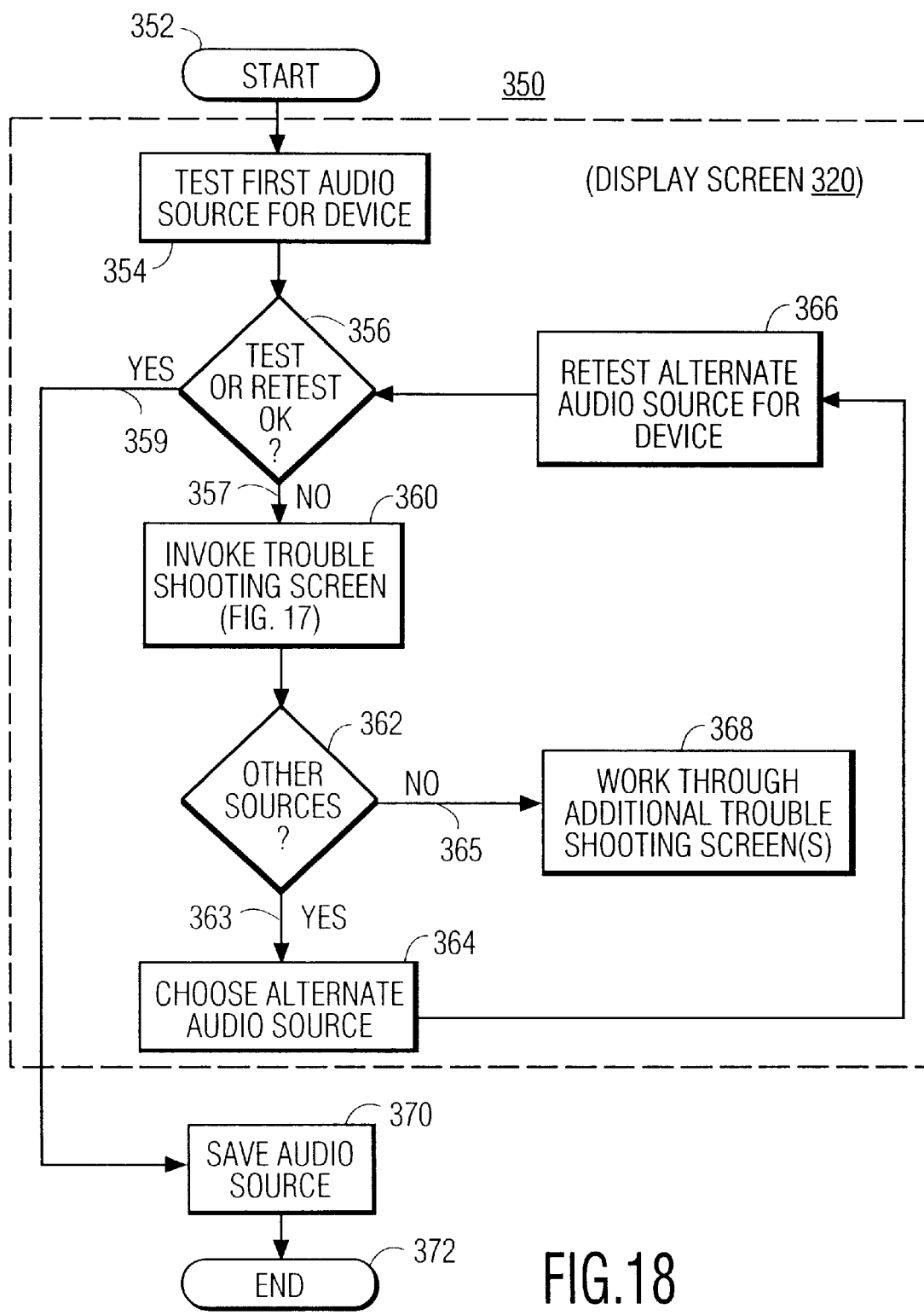
FIG. 18 is a flow chart useful for explaining trouble shooting a wrong audio source.

With reference to FIG. 18, which illustrates the trouble shooting process by flow chart 350, after starting at step 352, and prior to invocation of the trouble shooting screen 320, the user first tests the first possible audio source for that particular device in accordance with step 354. If the test is successful, in accordance with decision step 356, then further trouble shooting is unnecessary, and method branches on path 359 to step 370, in accordance with which the audio source is saved for use with the particular input device at a later time, and the process ends at step 372.

If the first audio source is incorrect, the test in decision step 356 is not successful, the method branches on path 357 and the trouble shooting screen 320 is invoked in accordance with step 360. The user is guided through the trouble shooting screen 320 shown in FIG. 17. The user is informed of the problem in the Title area 322, is shown the currently selected audio source in the first User Control area 328. If additional sources are available in accordance with decision step 362, the method branches on path 363 to step 364, in accordance with which the user is requested to choose another audio source to be tested utilizing the first User Control area 328. The user then selects an alternate audio source from the selection box in the first User Control area and activates the Test/Re-test button 334 in the second User Control area 332, in accordance with step 366. Information on what the user is supposed to do, for example visual feedback and test status, is displayed in the Status area 326. The method then returns to decision step 356, which determines if the retest was successful.

If the retest was successful, the method branches on path 359 to step 370, as explained above. However, if the retest was not successful, the method branches on path 357 to steps 360, 362, 364 and 366 if other sources are available. If no other audio sources are left, the method branches on path 365 to step 368, in accordance with which additional trouble shooting screens are invoked, such additional trouble shooting screens not forming a part of the inventive arrangements. Visual feedback on the currently selected audio source advantageously allows the user to select which audio sources should be tested, and in which order. The dashed line box indicates all of the steps which are advantageously implemented in connection with display screen 320.

What is claimed is:

1. A method for enabling user selectable input devices for dictation or transcription in a speech application, comprising the steps of:

establishing a registry of dictation and transcription device descriptions, each of said descriptions including a device specific image, a device specific set of device-connecting instructions and a device specific list of audio configuration parameters;

building dynamic tables containing information retrieved from said registry;

establishing and storing a plurality of enrollments, each of said enrollments representing a speech file of user specific training data corresponding to at least one of a specific audio input device and a specific audio environment; and, generating a graphical user interface (GUI) display screen using said information in at least one of said dynamic tables to enable user selection any input device in said registry for which one of said enrollments is available, for use as a dictation or transcription input to said speech application.

2. The method of claim 1, comprising the step of including in said GUI display screen a plurality of nested menus for identifying each said enrollment for each said device and enabling said user selection.

3. The method of claim 1, further comprising the step of identifying sets of compatible devices in said registry and in said dynamic tables.

4. The method of claim 3, further comprising the steps of:
searching for an enrollment with a compatible device when a user selects a device without a corresponding enrollment; and,
automatically using information from said compatible device to enable initiation of a dictation or transcription session without a training session.

5. The method of claim 2, further comprising the steps of:
identifying sets of compatible devices in said registry and in said dynamic tables; and,
displaying each said set of said compatible devices in said GUI display screen menus as a single selectable item.

6. The method of claim 1, comprising the step of storing text from recognized speech in a single document irrespective of said recognized speech being dictated directly to said speech application or played back from a transcription device.

7. A computer apparatus programmed with a routine set of instructions stored in a fixed medium, for enabling user selectable input devices for dictation or transcription in a speech application, comprising:
means for establishing a registry of dictation and transcription device descriptions, each of said descriptions including a device specific image, a device specific set of device-connecting instructions and a device specific list of audio configuration parameters;
means for building dynamic tables containing information retrieved from said registry;
means for establishing and storing a plurality of enrollments, each of said enrollments representing a speech file of user specific training data corresponding to at least one of a specific audio input device and a specific audio environment; and,
means for generating a graphical user interface (GUI) display screen using said information in at least one of said dynamic tables to enable user selection any input device in said registry for which one of said enrollments is available, for use as a dictation or transcription input to said speech application.

8. The apparatus of claim 7, wherein said GUI display screen includes a plurality of nested menus for identifying each said enrollment for each said device and enabling said user selection.

9. The apparatus of claim 7, further comprising means for identifying sets of compatible devices in said registry and in said dynamic tables.

10. The apparatus of claim 9, further comprising:
means for searching for an enrollment with a compatible device when a user selects a device without a corresponding enrollment; and,
means for automatically using information from said compatible device to enable initiation of a dictation or transcription session without a training session.

11. The apparatus of claim 8, further comprising:
means for identifying sets of compatible devices in said registry and in said dynamic tables; and,
means for displaying each said set of said compatible devices in said GUI display screen menus as a single selectable item.

12. The apparatus of claim 7, further comprising means for storing text from recognized speech in a single document irrespective of said recognized speech being dictated directly to said speech application or played back from a transcription device.

\* \* \* \* \*